(12) United States Patent
Abinal et al.

(10) Patent No.: US 11,453,242 B2
(45) Date of Patent: Sep. 27, 2022

(54) TIRE HAVING AN OPTIMIZED ARCHITECTURE

(71) Applicant: COMPAGNIE GENERALE DES ETABLISSEMENTS MICHELIN, Clermont-Ferrand (FR)

(72) Inventors: Richard Abinal, Clermont-Ferrand (FR); Mathieu Albouy, Clermont-Ferreand (FR); François-Xavier Bruneau, Clermont-Ferrand (FR); Cyril Charreire, Clermont-Ferrand (FR); Pierre Fevrier, Clermont-Ferrand (FR); Patrick Pallot, Clermont-Ferrand (FR)

(73) Assignee: COMPAGNIE GENERALE DES ETABLISSMENTS MICHELIN, Clermont-Ferrand (FR)

( * ) Notice: Subject to any disclaimer, the term of this patent is extended or adjusted under 35 U.S.C. 154(b) by 628 days.

(21) Appl. No.: 16/343,520

(22) PCT Filed: Oct. 20, 2017

(86) PCT No.: PCT/FR2017/052886
§ 371 (c)(1),
(2) Date: Apr. 19, 2019

(87) PCT Pub. No.: WO2018/073547
PCT Pub. Date: Apr. 26, 2018

(65) Prior Publication Data
US 2019/0241019 A1 Aug. 8, 2019

(30) Foreign Application Priority Data
Oct. 21, 2016 (FR) ....................... 1660245

(51) Int. Cl.
*B60C 9/28* (2006.01)
*B60C 9/20* (2006.01)
(Continued)

(52) U.S. Cl.
CPC .............. *B60C 9/28* (2013.01); *B60C 9/0292* (2013.01); *B60C 9/2009* (2013.01);
(Continued)

(58) Field of Classification Search
CPC ......... B60C 9/18; B60C 9/185; B60C 9/1835; B60C 9/24; B60C 2009/1871;
(Continued)

(56) References Cited

U.S. PATENT DOCUMENTS 3,599,696 A * 8/1971 Hartz .................... B60C 9/1821
152/153
5,871,597 A * 2/1999 Vasseur .................... B60C 1/00
152/209.5

(Continued)

FOREIGN PATENT DOCUMENTS

ER 1 338 441 8/2003
FR 2 984 230 6/2013
(Continued)

OTHER PUBLICATIONS

English machine translation of JPS62-261505. (Year: 1987).*
English machine translation of JPH06-293026. (Year: 1994).*
English machine translation of JPH05-319016. (Year: 1993).*

*Primary Examiner* — Robert C Dye
(74) *Attorney, Agent, or Firm* — Cozen O'Connor

(57) ABSTRACT

Tire comprising major grooves with a depth at least equal to 4 mm and with a width at least equal to 1 mm. The radially outermost working layer (41) comprises at least one undulation (412). The undulation (412) is such that the undulation (412) portion of the working layer (41) represents at least (Continued)

10% of the surface of the working layer (41), has an amplitude of at least 1 mm and is radially on the outside of the points of the working layer (41) that are in line with the bottom face (243) of the major groove (24) closest (412). All the layers of material (3, 6, 7) making up the radial stack of the crown structure (S) have mean surfaces parallel to that of the radially outermost working layer (41).

16 Claims, 1 Drawing Sheet

(51) Int. Cl.
  *B60C 9/02* (2006.01)
  *B60C 11/00* (2006.01)
(52) U.S. Cl.
  CPC ............. *B60C 2009/2032* (2013.01); *B60C 2011/0025* (2013.01); *B60C 2011/0033* (2013.01)
(58) Field of Classification Search
  CPC .... B60C 2009/1878; B60C 2009/2032; B60C 9/0292; B60C 9/28
  See application file for complete search history.

(56) References Cited

U.S. PATENT DOCUMENTS

| | | | |
|---|---|---|---|
| 2002/0088523 A1* | 7/2002 | Miyazaki | B60C 9/22 152/537 |
| 2005/0230020 A1* | 10/2005 | Miyake | B60C 11/12 152/209.19 |
| 2009/0236022 A1* | 9/2009 | Matsuda | B60C 5/14 152/560 |
| 2018/0207996 A1* | 7/2018 | Serva | B60C 11/04 |

FOREIGN PATENT DOCUMENTS

| | | | |
|---|---|---|---|
| FR | 3 014 442 | | 6/2015 |
| JP | S62-261505 | * | 11/1987 |
| JP | H05-319016 | * | 12/1993 |
| JP | H06-293026 | * | 10/1994 |
| JP | 2001 191723 | | 7/2001 |

\* cited by examiner

US 11,453,242 B2

TIRE HAVING AN OPTIMIZED ARCHITECTURE

RELATED APPLICATIONS

This is a U.S. National Phase Application under 35 USC 371 of International Application PCT/FR2017/052886 filed on Oct. 20, 2017.

This application claims the priority of French application no. 1660245 filed Oct. 21, 2016, the entire content of which is hereby incorporated by reference.

FIELD OF THE INVENTION

The present invention relates to a tire intended to be fitted to a vehicle, and more particularly to the crown of such a tire.

BACKGROUND OF THE INVENTION

Since a tire has a geometry that exhibits symmetry of revolution about an axis of rotation, the geometry of the tire is generally described in a meridian plane containing the axis of rotation of the tire. For a given meridian plane, the radial, axial and circumferential directions denote the directions perpendicular to the axis of rotation of the tire, parallel to the axis of rotation of the tire and perpendicular to the meridian plane, respectively. The circumferential median plane referred to as the equatorial plane divides the tire into two substantially symmetrical half-torus shapes, it being possible for the tire to exhibit asymmetries of the tread, of architecture, which are connected with the manufacturing precision or with the sizing.

In the following text, the expressions "radially on the inside of" and "radially on the outside of" mean "closer to the axis of rotation of the tire, in the radial direction, than" and "further away from the axis of rotation of the tire, in the radial direction, than", respectively. The expressions "axially on the inside of" and "axially on the outside of" mean "closer to the equatorial plane, in the axial direction, than" and "further away from the equatorial plane, in the axial direction, than", respectively. A "radial distance" is a distance with respect to the axis of rotation of the tire and an "axial distance" is a distance with respect to the equatorial plane of the tire. A "radial thickness" is measured in the radial direction and an "axial width" is measured in the axial direction.

In what follows, the expression "in line with" means "for each meridian, radially on the inside within the boundaries of the axial coordinates delimited by". Thus, "the points of a working layer that are in line with a groove" refer, for each meridian, to the collection of points in the working layer that are radially on the inside of the groove within the boundaries of the axial coordinates delimited by the groove.

A tire comprises a crown comprising a tread that is intended to come into contact with the ground via a tread surface, two beads that are intended to come into contact with a rim, and two sidewalls that connect the crown to the beads. Furthermore, a tire comprises a carcass reinforcement, comprising at least one carcass layer, radially on the inside of the crown and connecting the two beads.

The tread of a tire is delimited, in the radial direction, by two circumferential surfaces of which the radially outermost is the tread surface and of which the radially innermost is referred to as the tread pattern bottom surface. The tread pattern bottom surface, or bottom surface, is defined as being the surface of the tread surface translated radially inwards by a radial distance equal to the tread pattern depth. It is commonplace for this depth to be degressive on the axially outermost circumferential portions, referred to as the shoulders, of the tread.

In addition, the tread of a tire is delimited, in the axial direction, by two lateral surfaces. The tread is also made up of one or more rubber compounds. The expression "rubber compound" refers to a composition of rubber comprising at least an elastomer and a filler.

The crown comprises at least one crown reinforcement radially on the inside of the tread. The crown reinforcement comprises at least one working reinforcement comprising at least one working layer made up of mutually parallel reinforcing elements that form, with the circumferential direction, an angle of between 15° and 50°. The crown reinforcement may also comprise a hoop reinforcement comprising at least one hooping layer made up of reinforcing elements that form, with the circumferential direction, an angle of between 0° and 10°, the hoop reinforcement usually, although not necessarily, being radially on the outside of the working layers.

For any layer of crown, working or other reinforcement reinforcing elements, a continuous surface, referred to as the radially outer surface (ROS) of the said layer, passes through the radially outermost point of each reinforcing element of each meridian. For any layer of crown, working or other reinforcement reinforcing elements, a continuous surface, referred to as the radially inner surface (RIS) of the said layer, passes through the radially innermost point of each reinforcing element of each meridian. The radial distances between a layer of reinforcing elements and any other point are measured from one or other of these surfaces and in such a way as to not incorporate the radial thickness of the said layer. If the other measurement point is radially on the outside of the layer of reinforcing elements, the radial distance is measured from the radially outer surface ROS to this point, and, respectively, from the radially inner surface RIS to the other measurement point if the latter is radially on the inside of the layer of reinforcing elements. This makes it possible to consider radial distances that are coherent from one meridian to the other, without the need to take into consideration possible local variations associated with the shapes of the sections of the reinforcing elements of the layers.

In order to obtain good grip on wet ground, cuts are made in the tread. A cut denotes either a well, or a groove, or a sipe, or a circumferential groove and forms a space opening onto the tread surface.

A sipe or a groove has, on the tread surface, two characteristic main dimensions: a width W and a length Lo, such that the length Lo is at least equal to twice the width W. A sipe or a groove is therefore delimited by at least two main lateral faces determining its length Lo and connected by a bottom face, the two main lateral faces being distant from one another by a non-zero distance referred to as the width W of the sipe or of the groove.

The depth of the cut is the maximum radial distance between the tread surface and the bottom of the cut. The maximum value for the depths of the cuts is referred to as the tread pattern depth D.

A tire needs to meet numerous performance criteria relating to phenomena such as wear, grip on various types of ground, rolling resistance, dynamic behaviour and weight. These performance criteria sometimes lead to solutions that compromise other criteria. Thus, for good grip performance, the rubber material of the tread needs to be dissipative and soft. In contrast, in order to obtain a tire that performs well in terms of behaviour, notably in terms of dynamic response to transverse loading of the vehicle and therefore loading chiefly along the axis of the tire, the tire needs to have a sufficiently high level of stiffness, notably under transverse load. For a given size, the stiffness of the tire is dependent on the stiffness of the various elements of the tire that are the tread, the crown reinforcement, the sidewalls and the beads. The tread is traditionally stiffened either by stiffening the rubber materials, or by reducing the depth of the tread pattern or by reducing the groove-to-rubber ratio of the tread pattern.

In order to alleviate the problem, tire manufacturers have, for example, changed the rubber material by stiffening it notably using fibres, as mentioned in documents FR 3 014 442 and FR 2 984 230.

These solutions are not always satisfactory. Reducing the tread pattern depth limits the performance in terms of wear and in terms of wet grip. Stiffening the rubber material limits the wet and dry grip capabilities and also increases the tire noise during running. Reducing the void volume of the tread pattern reduces the wet grip capabilities particularly when there is a great depth of standing water. It is also important to maintain a certain thickness of rubber materials between the bottom face of the cuts, grooves or circumferential grooves and the reinforcing elements of the radially outermost crown reinforcement, in order to ensure the durability of the tire.

SUMMARY OF THE INVENTION

One object of the present invention is to increase the performance of the tire in terms of behaviour by improving its grip, and more particularly wet grip, and rolling-resistance performance without altering its wearing and crown-durability performance. The solution also makes it possible to improve the consumption of raw material during manufacture.

This objective is achieved by in accordance with one aspect of the invention directed to a tire comprising:
  a tread which is intended to come into contact with the ground via a tread surface comprising grooves,
  a groove forming a space opening onto the tread surface and being delimited by two main lateral faces connected by a bottom face,
  at least one groove having a width W defined by the mean distance between the two lateral faces and a depth D defined by the maximum radial distance between the tread surface and the bottom face,
  at least one groove is referred to as a major groove, having a width W at least equal to 1 mm and a depth D at least equal to 4 mm,
  the tire further comprising a crown structure radially on the inside of the tread, made up of a radial stack of continuous or discontinuous layers of material,
  the crown structure comprising radially from the outside to the inside a crown reinforcement, a carcass reinforcement and an inner polymeric layer,
  the crown reinforcement comprising at least one working reinforcement comprising at least one working layer,
  a working layer extending radially from a radially outer surface to a radially inner surface (RIS),
  a working layer comprising reinforcing elements at least partially made of metal, which are continuous from one axially outer edge of the working layer to the opposite axially outer edge, coated in an elastomer material, mutually parallel and which with the circumferential direction of the tire form an oriented angle the absolute value of which is at least equal to 20° and at most equal to 50°,
  the radially outermost working layer comprising at least one undulation,
  the at least one undulation in the radially outermost working layer is such that the working layer portion of the undulation is radially on the outside of the points of the working layer that are in line with the centre of the bottom face of the major groove closest to the said undulation,
  the at least one undulation in the radially outermost working layer being such that, over at least 10% of the radially outer surface of the said radially outermost working layer, the radial distance, between the radially outer surface of the radially outermost working layer and the tread surface, is at least 1 mm less than the radial distance between the radially outer surface of the radially outermost working layer and the tread surface, which is the distance in line with the centre of the bottom face of the major groove closest to the said undulation,
  all the layers of material making up the radial stack of the crown structure have mean surfaces parallel to that of the radially outermost working layer,
  the minimum radial distance between the radially outer surface of the radially outermost layer of the crown reinforcement and the tread surface is at most equal to the depth D of the closest major groove, increased by 2 mm.

In order to improve the dynamic response under axial load, the tire therefore needs to be stiffened in its axial component which, in the case of its structural part, is essentially given by the stiffness of the metallic working layers and the distance between these and the tread surface. Specifically, the metallic working layers are rigid in tension and in compression because of their materials. They are also rigid in shear because of their coupling and the angle they make with the circumferential direction and because they are coupled with only a thin thickness of rubber materials between them.

By contrast, the materials between the working layers and the tread surface work in shear under transverse load. The greater the radial thickness of these materials, the less stiff this part of the crown is, and the greater the extent to which the dynamic response performance under axial load is diminished. Therefore it is necessary to reduce this distance. However, it is necessary to maintain the tread pattern depth D in order to preserve the wearing and wet grip performance of the tire.

Moreover, it is necessary to preserve the radial distance d1, referred to as the beneath-void depth, between the radially outer surface (ROS) of the radially outermost working layer and the bottom face of the major grooves, in order to protect the reinforcing elements of the various working layers from puncturing. One solution to this problem is to leave unchanged the tread pattern depth D and the beneath-void depth d1 which are measured in line with the major grooves, and to reduce the radial distance do between the working layers and the tread surface in line with those tread portions that are devoid of major grooves.

Bearing in mind the fact that the tread surface of a tire is substantially cylindrical, this solution amounts to undulating the working layers radially according to undulations which may or may not be identical for every meridian plane, depending on the tread pattern and the choice of the designer. This solution goes against methods of tire manufacture for which the working layers are laid on substantially cylindrical forms, the working layers exhibiting in the meridian plane, for the tires of the prior art, a curvature that is even, without a point of inflection. Thus, the crown is made up, according to the prior art, of stacks of layers of material that are substantially parallel. It is common practice to very locally uncouple certain layers at the ends of the reinforcing elements that form them. These layers are arranged at a substantially constant radius. According to the invention, these layers are arranged with variations in radius over a minimal surface area in order to provide the expected advantages and exhibit at least one point of inflection in the meridian plane.

Motorcycle tires are not generally arranged at a substantially constant radius. However, for these tires, the layers of material of the crown are arranged along a convex, continuous curve. The invention could moreover also apply to these tires, the undulations creating zones of greater concavity and exhibiting convexity about the continuous curve of the tire according to the prior art.

Moreover, undulating the layers of reinforcing elements may appear to make the tire more sensitive to variations in the geometry of the tread surface, impairing performance aspects such as uneven wear resistance, out-of-balance, etc. Nevertheless, the solution yields very good performance against these criteria.

In addition, undulating the layers of reinforcing elements subjected to compressive loadings goes against the recommendations for combating the buckling of the structures. Specifically, creating a discontinuity in a radius of curvature amounts to the creation of additional stresses where buckling may occur. However, in the tire, the loadings are very highly localized, which means that part of the crown is in tension when another part is in compression, on a scale that is very much smaller than that of the undulations. Thus, the undulations made within the limits of the invention do not detract from the durability of the tire.

In order to avoid any problem of crown durability associated with impacts as the tire runs along a road surface exhibiting an obstacle, or associated with the fatigue of the rubber material at the end of the reinforcing elements, it is important that the reinforcing elements of the working layer be continuous from one axially outer edge of the working layer to the opposite axially outer edge. The reinforcing elements of the working layer comprise one or more braided or unbraided metallic threads. It is important that these threads be very predominantly continuous across the entire width of the working layer so that the working layer is itself continuous.

Experience shows that in order to improve the performance in terms of dynamic behaviour under transverse load, one of the criteria which is sufficient in itself is to decrease the distance (do) between the radially outer surface (ROS) of the radially outermost working layer and the tread surface. This makes it possible to reduce the sheared thicknesses of rubber materials of the tread and to reduce the production of heat caused by the hysteresis of these materials. These effects are beneficial both with regard to the stiffness of the tread, which is dependent on temperature, and with regard to the rolling resistance and durability performance aspects. Undulating the working layer additionally makes it possible to increase the axial stiffness of the tires by increasing the flexural inertia on the edge of the crown, something which leads to an appreciable improvement in behavioural performance. Moreover, in certain tires, the crown comprises just one working layer, and the invention also works in such cases.

This distance (do) is decreased by creating at least one undulation in the working layer, such that this undulation or undulated part of the working layer is radially on the outside of the part of the working layer that is in line with the major groove closest to the said undulation. It is not a matter of considering as being undulated a working layer that is not undulated but that meets the criterion for reducing the distance (do) by decreasing the tread pattern depth in a given zone. This feature is moreover known notably for tires for passenger vehicles the tread pattern depth of which is smaller on the axially outer edges, known as shoulders, of the tire than in the closest major grooves. In tires according to the prior art, in the part at the shoulders where the radial distance (do) diminishes, the working layer is either at the same radius, or radially on the inside of those parts of the same working layer that are in line with the closest major groove.

The invention also works if one or more undulations are positioned in one or more of the parts of one or more shoulders of the tire.

The beneath-void distance (d1) needs to be maintained in the major grooves. The minor grooves or the sipes are less sensitive to puncturing and to attack from obstacles because they are protected by the rubber material that technically characterizes them as being shallow or narrow grooves.

The layers with a low stiffness, by comparison with the working layers, such as the protective layers, which may or may not be metallic, the hooping layers, containing reinforcing elements that, with the circumferential direction (XX') of the tire, make an angle B at most equal, in terms of absolute value, to 10°, do not have sufficiently high compression stiffness or shear stiffness, because of their materials, which are sometimes textile, and because of the angles at which they are laid, for undulating these layers alone to afford to the problem a solution that has the same level of effectiveness as does the invention. These protective or hooping layers are optional in a tire and do not govern the benefit of the solution.

It is possible to create undulations of the radially outermost working layer by adding an element of padding rubber in line therewith, but it is also possible to modify the manufacturing or curing apparatus so as to create an undulation that does not require addition of an element of padding rubber in order to obtain a tire according to the invention. This amounts to subtracting a part of the volume of the tread, and thus to saving material and possibly, depending on the mode of operation of the tire, to reducing the rolling resistance. In this case, all the layers of material in line with the undulation remain substantially parallel to the radially outermost working layer.

It would appear that undulating the radially outer surface of the working layer by 10% is enough to register an improvement in dynamic performance under transverse load. The amplitude of this undulation needs to be at least equal to 1 mm in order to have significant effects at tire level. Thus, the radial distance between the radially outer surface of the radially outermost working layer and the tread surface is at least 1 mm less than the radial distance between the radially outer surface of the radially outermost working layer and the tread surface, which is the distance in line with the centre of the bottom face of the major groove closest to the said undulation.

The optimum solution takes into account the characteristics of the tire and possibly of the vehicle. Optimization may be carried out depending on the directional nature of the tire, on the asymmetry thereof, and on the camber angle of the vehicle.

For preference, over at least 10%, preferably at least 20% and at most 85%, of the radially outer surface (ROS) of the radially outermost working layer, the radial distance (do) between the radially outer surface (ROS) of the radially outermost working layer and the tread surface is at least 1.5 mm, and preferably 2 mm, less than the radial distance (dc) between the radially outer surface (ROS) of the radially outermost working layer and the tread surface, which is the distance in line with the centre of the bottom face of the major groove closest to the said undulation. The design parameters that make it possible to regulate the dynamic response under significant transverse load, representing at least of the order of 50% of the nominal tire load, are:

The extent of the undulations of the radially outermost working layer, in the knowledge that the void ratio of the tread pattern, which is rarely less than 15%, limits it to at most 85% (100%-15%). The more extensive the undulation, the stiffer the tire under transverse load, the better its rolling resistance performance, and the lighter its weight.

The amplitude of the undulation is at least equal to 1 mm, but limited to 5 mm because of the radii of curvature that have to be imparted to the metallic working layers which are stiff and therefore not very deformable.

One preferred solution is therefore that, over at least 10%, preferably at least 20% and at most 85%, of the radially outer surface (ROS) of the radially outermost working layer, the radial distance (do) between the radially outer surface (ROS) of the radially outermost working layer and the tread surface is at most 5 mm, and preferably at most 3 mm, less than the radial distance (dc) between the radially outer surface (ROS) of the radially outermost working layer and the tread surface, which is the distance in line with the centre of the bottom face of the major groove closest to the said undulation.

For optimum performance in terms of puncturing and attack of the crown, without penalizing the rolling resistance, the radial distance (d1) between the radially outer surface (ROS) of the radially outermost working layer and the bottom face of the major grooves is at least equal to 1 mm and at most equal to 5 mm, preferably at least equal to 2 mm and at most equal to 4 mm. Below the lower limits, the tire may prove too sensitive to attack. Above the upper limits, the rolling resistance of the tire would be penalized.

It is advantageous for the tread, for example a major groove of the tread, to comprise at least one wear indicator, and for the minimum radial distance (du) between the radially outer surface (ROS) of the radially outermost layer of the crown reinforcement and the tread surface to be at least equal to the radial distance (df) between the tread surface and the radially outermost point of the wear indicator. Specifically, it is important for the user to be able to perceive that the tire is worn, using the wear indicator, and to be able to do so before the reinforcing elements of the radially outermost layer of the crown reinforcement begin to appear on the tread surface.

Advantageously, the minimum radial distance (du) between the radially outer surface (ROS) of the radially outermost layer of the crown reinforcement and the tread surface is at most equal to the depth D of the closest major groove, increased by 2 mm, and at least equal to the depth D of the closest major groove, decreased by 2 mm. This solution allows ideal positioning of the radially outermost layer of reinforcing elements of the crown reinforcement, and the tread surface. The minimum radial distance (du) between the radially outer surface (ROS) of the radially outermost layer of the crown reinforcement and the tread surface has to be measured over the radially outer portion of the crown reinforcement, and therefore at an undulation.

For preference, the depth D of a major groove is at least equal to 6 mm and at most equal to 20 mm. Tread pattern depths of between 6 and 10 mm allow a good compromise between wearing and rolling resistance performance aspects in many passenger vehicle tires. Tread pattern depths of between 10 and 20 mm are attractive for the same compromises in tires for vehicles that carry heavy loads. The invention is not restricted to tires for a particular use.

In instances in which the radially outermost layer of reinforcing elements is a hooping layer, it is advantageous for the radially outermost layer of reinforcing elements in the crown reinforcement to comprise reinforcing elements made of textile, preferably of the aliphatic polyamide, aromatic polyamide type, of a type involving a combination of aliphatic polyamide and aromatic polyamide, of polyethylene terephthalate or of rayon type, which are mutually parallel and form, with the circumferential direction (XX') of the tire, an angle B at most equal to 10°, in terms of absolute value, It is preferable for the crown reinforcement to consist of 2 working plies of opposite angles and one hooping ply, as in numerous present-day crown architectures.

BRIEF DESCRIPTION OF THE DRAWINGS

The features and other advantages of the invention will be understood better with the aid of FIGS. 1 and 2, the said figures being drawn not to scale but in a simplified manner so as to make it easier to understand the invention.

DETAILED DESCRIPTION OF THE DRAWINGS

Figure 1:
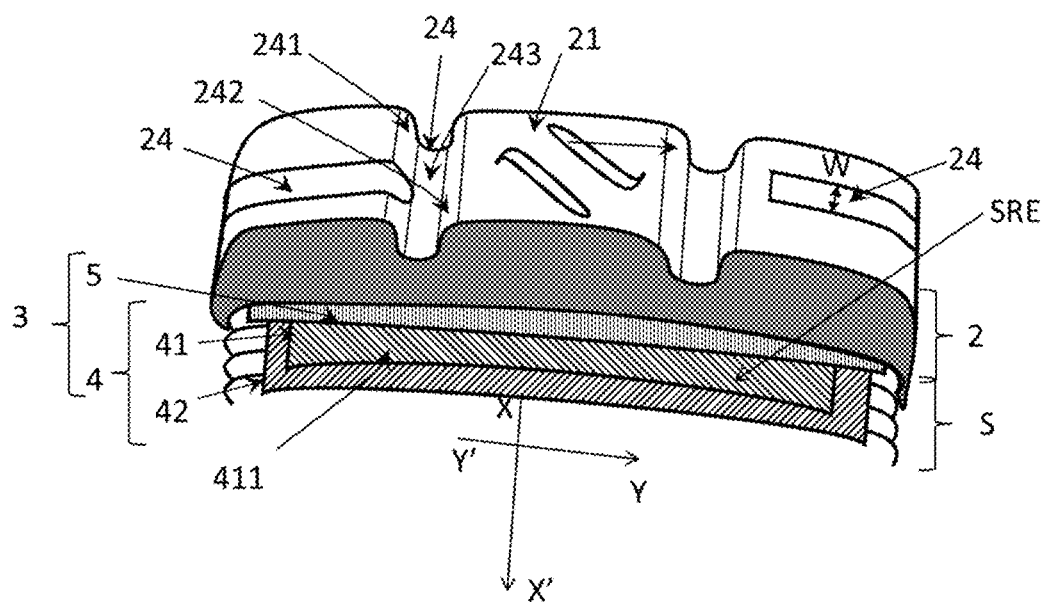
FIG. 1 is part of a tire, particularly the architecture and the tread thereof.

FIG. 1 depicts a perspective view of a part of the crown of a tire. A cartesian frame of reference (XX', YY', ZZ') is associated with each meridian plane. The tire comprises a tread 2 which is intended to come into contact with the ground via a tread surface 21. Arranged in the tread are grooves 24 of width W possibly differing from one groove to another, each having main profiles 241 and 242 and a bottom face 243. The tire also comprises a crown structure comprising a crown reinforcement 3 only present at the crown. This crown reinforcement 3 comprises a working reinforcement 41 and here, for example, a hoop reinforcement 5. The crown structure also comprises the portion of the carcass reinforcement 6 and of the sealing layer 7 which continue through the sidewalls as far as the bead of the tire.

The working reinforcement comprises at least one working layer and here, for example, two working layers 41 and 42 each comprising mutually parallel reinforcing elements. The radially outer surface (ROS) of the radially outermost working layer (41) is also depicted.

Figure 2:
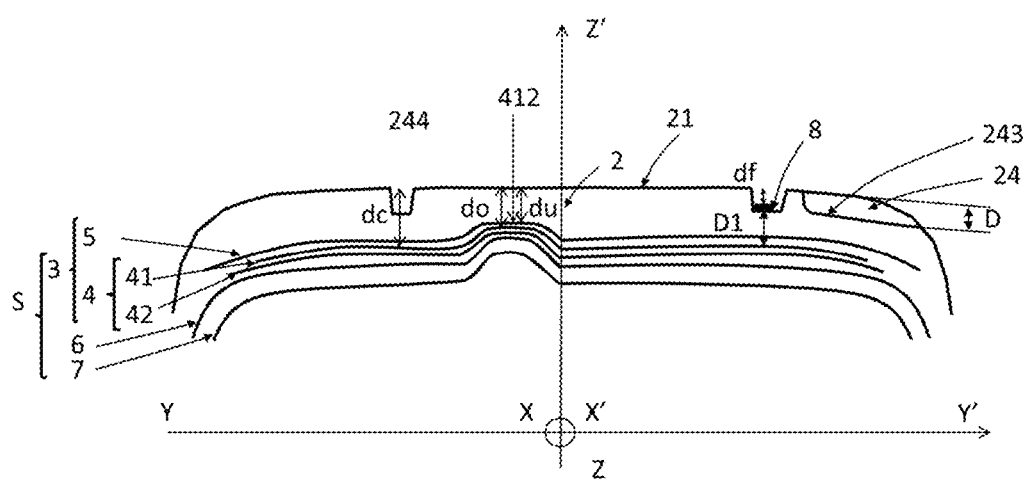
FIG. 2 depicts a meridian section through the crown of a tire according to an embodiment of the invention and illustrates the various radial distances du, do, d1, D, df, dc and the undulation in the radially outermost working layer, the radially inner layers of material (42, 6, 7) being substantially parallel to the latter.

FIG. 2 depicts a schematic meridian section through the crown of the tire according to the invention. It illustrates in particular an undulation of the radially outermost working layer (41) and the set of layers of material in line therewith. FIG. 2 also illustrates the following radial distances:

D: the depth of a groove, which is the maximum radial distance between the tread surface (21) and the bottom face (243) of the groove, dc: the radial distance between the radially outer surface (ROS) of the radially outermost working layer (41) and the tread surface (21), which is the distance in line with the centre of the bottom face (243) of the major groove (24) closest to the said undulation (412), do: the radial distance between the radially outer surface (ROS) of the radially outermost working layer (41) and the tread surface at the undulation (412), du: the minimum radial distance between the radially outer surface (ROS) of the radially outermost layer (41) of the crown reinforcement (3) and the tread surface (21), df: the radial distance between the tread surface (21) and the radially outermost point of the wear indicator (8), d1: the distance between the radially outer surface (ROS) of the radially outermost working layer (41) and the bottom face (243) of the major grooves (24).

A meridian section through the tire is obtained by cutting the tire on two meridian planes. This section is used to determine the various radial distances, the centre of the bottom faces of the grooves and of the circumferential grooves.

The invention was carried out on a tire A of size 305/30 ZR20 intended to be fitted to a passenger vehicle. The depths D of the grooves of the tread pattern are comprised between 4 and 7 mm for widths W varying between 4 and 15 mm. The crown reinforcement is made up of two working layers the reinforcing elements of which make an angle of + or −38° with the circumferential direction and of a hooping layer the reinforcing elements of which make an angle of + or −3° with the circumferential direction. The reinforcing elements of the working layer are continuous metallic cords. The radially outermost working layer is undulated over 50% of its radially outer surface. The undulations have radial distances do between the radially outer surface (ROS) of the radially outermost working layer (41) and the tread surface at the undulations (412) that are greater by 1 mm than the radial distances (dc) between the radially outer surface (ROS) of the radially outermost working layer (41) and the tread surface (21), which are the distances in line with the centre of the bottom face of the major grooves (24) closest to the said undulations (412). Over 20% of its radially outer surface, the radial distances do are 2 mm greater than or equal to the radial distances (dc). The radial distance (d1) between the radially outer surface (ROS) of the radially outermost working layer (41) and the bottom face (243) of the major grooves (24) is comprised between 2 mm and 3.5 mm.

Tires A were compared with tires B of the same size, having the same characteristics except that the working layers were not undulated.

The undulations thus created generate a weight saving of around 300 g on the tire.

The improvement in terms of rolling resistance of the invention was evaluated on a standard machine for measurements standardized in accordance with ISO 2850:2009. The tests reveal a more than 6% improvement by comparison with the reference tire B.

Furthermore, a measurement of the characteristic Dz of the Pacejka tire behaviour model well known to those skilled in the art reveals a 15% improvement in this characteristic for a pressure of 3.6 b, hot. The improvement in dry grip varies between 1 and 5% depending on the stress loading conditions.

The tires were also fitted to a sports-type vehicle and tested on a winding circuit capable of generating significant transverse loadings. A professional driver, trained in assessing tires, compares tires A according to the invention with tires B according to the prior art and according to a rigourous testing process, under the same temperature conditions and ground running conditions, without knowing the features of the tires being tested, repeating the measurement. The driver assigns scores to the tires. In all the tests performed, tires A according to the invention outclass tires B in terms of vehicle behaviour, roadholding, on dry ground and in terms of grip. Furthermore, the behavioural performance is more constant during a behaviour test on a vehicle fitted with a tire according to the invention than with a tire according to the prior art.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire, comprising:
a tread which is adapted to come into contact with the ground via a tread surface comprising grooves;
each said groove forming a space opening onto the tread surface and being delimited by two main lateral faces connected by a bottom face;
at least one said groove having a width W defined by the mean distance between the two lateral faces and a depth D defined by the maximum radial distance between the tread surface and the bottom face;
at least one said groove is referred to as a major groove, having a width W at least equal to 1 mm and a depth D between 4 mm and 7 mm;
the tire further comprising a crown structure radially on the inside of the tread, the crown structure being constituted by a radial stack of continuous or discontinuous layers of material;
the crown structure comprising radially from the outside to the inside a crown reinforcement, a carcass reinforcement and an inner polymeric layer;
the crown reinforcement comprising at least one working reinforcement comprising at least one working layer;
said working layer extending radially from a radially outer surface to a radially inner surface; and
said working layer comprising reinforcing elements at least partially comprised of metal, which are continuous from one axially outer edge of the working layer to the opposite axially outer edge, coated in an elastomer material, mutually parallel and which with the circumferential direction of the tire form an oriented angle the absolute value of which is at least equal to 20° and at most equal to 50°,
wherein the radially outermost working layer comprises at least one undulation arranged axially between major grooves,
wherein the at least one undulation in the radially outermost working layer is such that the working layer portion of the undulation is radially on the outside of the points of the working layer that are in line with the centre of the bottom face of the major groove closest to said undulation, wherein the at least one undulation comprises a first portion that extends radially towards the tread surface and a second portion that extends radially away from the tread surface, wherein the at least one undulation in the radially outermost working layer is such that, over at least 10% of the radially outer surface of said radially outermost working layer, the radial distance, between the radially outer surface of the radially outermost working layer and the tread surface, is at least 1 mm less than the radial distance between the radially outer surface of the radially outermost working layer and the tread surface, which is the distance in line with the centre of the bottom face of the major groove closest to the said undulation, wherein the crown reinforcement, the carcass reinforcement and the inner polymeric liner constituting the radial stack of the crown structure have surfaces substantially parallel to that of the radially outermost working layer, and wherein the minimum radial distance between the radially outer surface of the radially outermost layer of the crown reinforcement and the tread surface is at most equal to the depth D of the closest major groove, increased by 2 mm.

2. The tire according to claim 1, wherein, over at least 10% of the radially outer surface of the radially outermost working layer, the radial distance between the radially outer surface of the radially outermost working layer and the tread surface is at least 1.5 mm less than the radial distance between the radially outer surface of the radially outermost working layer and the tread surface, which is the distance in line with the centre of the bottom face of the major groove closest to said undulation.

3. The tire according to claim 1, wherein, over at least 10% of the radially outer surface of the radially outermost working layer, the radial distance between the radially outer surface of the radially outermost working layer and the tread surface is at most 5 mm less than the radial distance between the radially outer surface of the radially outermost working layer and the tread surface, which is the distance in line with the centre of the bottom face of the major groove closest to said undulation.

4. The tire according to claim 1, wherein the radial distance between the radially outer surface of the radially outermost working layer and the bottom face of the major grooves is at least equal to 1 mm and at most equal to 5 mm.

5. The tire according to claim 1, where at least one major groove of the tread comprises at least one wear indicator, wherein the minimum radial distance between the radially outer surface of the radially outermost layer of the crown reinforcement and the tread surface is at least equal to the radial distance between the tread surface and the radially outermost point of the wear indicator.

6. The tire according to claim 1, wherein the minimum radial distance between the radially outer surface of the radially outermost layer of the crown reinforcement and the tread surface is at least equal to the depth D of the closest major groove, decreased by 2 mm.

7. The tire according to claim 1, wherein the radially outermost layer of reinforcing elements of the crown reinforcement comprises reinforcing elements made of textile of a type involving a combination of aliphatic polyamide and aromatic polyamide, of polyethylene terephthalate or of rayon type, which are mutually parallel and form, with the circumferential direction of the tire, an angle B at most equal to 10°, in terms of absolute value.

8. The tire according to claim 1, wherein the crown reinforcement consists of two working plies of opposite angles and one hooping ply.

9. The tire according to claim 1, wherein, over at least 20% and at most 85%, of the radially outer surface of the radially outermost working layer, the radial distance between the radially outer surface of the radially outermost working layer and the tread surface is at least 2 mm less than the radial distance between the radially outer surface of the radially outermost working layer and the tread surface, which is the distance in line with the centre of the bottom face of the major groove closest to said undulation.

10. The tire according to claim 1, wherein, over at least 20% and at most 85%, of the radially outer surface of the radially outermost working layer, the radial distance between the radially outer surface of the radially outermost working layer and the tread surface is at most 3 mm less than the radial distance between the radially outer surface of the radially outermost working layer and the tread surface, which is the distance in line with the centre of the bottom face of the major groove closest to said undulation.

11. The tire according to claim 1, wherein the radial distance between the radially outer surface of the radially outermost working layer and the bottom face of the major grooves is at least equal to 2 mm and at most equal to 4 mm.

12. The tire according to claim 1, wherein the radially outermost layer of reinforcing elements of the crown reinforcement comprises reinforcing elements made of textile of aliphatic polyamide type, aromatic polyamide type, of a type involving a combination of aliphatic polyamide and aromatic polyamide, of polyethylene terephthalate or of rayon type, which are mutually parallel and form, with the circumferential direction of the tire, an angle B at most equal to 10°, in terms of absolute value.

13. The tire according to claim 1, wherein the radially outermost working layer extends axially towards a respective shoulder from a radially inner end of the first portion of the undulation that extends radially towards the tread surface and a radially inner end of the second portion of the undulation that extends radially away from the tread surface.

14. The tire according to claim 1, wherein the crown reinforcement comprising the at least one working reinforcement comprising at least two working layers each having a respective undulation, wherein the working layer undulations are not identical for every meridian plane.

15. The tire according to claim 1, wherein the carcass reinforcement has an undulation that is arranged radially inside the at least one undulation of the radially outermost working layer.

16. The tire according to claim 1, wherein one of the radially inner end of the first portion of the undulation and the radially inner end of the second portion of the undulation is arranged at an axial midpoint of the tire.

* * * * *